United States Patent
Subramanian et al.

(10) Patent No.: US 10,742,602 B2
(45) Date of Patent: Aug. 11, 2020

(54) INTRUSION PREVENTION

(71) Applicant: Lantiq Beteiligungs-GmbH & Co. KG, Neubiberg (DE)

(72) Inventors: Shiva Shankar Subramanian, Singapore (SG); Pinxing Lin, Singapore (SG)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 203 days.

(21) Appl. No.: 15/757,513

(22) PCT Filed: Sep. 21, 2015

(86) PCT No.: PCT/EP2015/071580
§ 371 (c)(1),
(2) Date: Mar. 5, 2018

(87) PCT Pub. No.: WO2017/050346
PCT Pub. Date: Mar. 30, 2017

(65) Prior Publication Data
US 2018/0270197 A1    Sep. 20, 2018

(51) Int. Cl.
*H04L 29/06* (2006.01)
*H04L 12/26* (2006.01)
(Continued)

(52) U.S. Cl.
CPC .......... *H04L 63/0227* (2013.01); *H04L 43/50* (2013.01); *H04L 47/225* (2013.01);
(Continued)

(58) Field of Classification Search
CPC ............ H04L 63/0227; H04L 63/1408; H04L 63/1416; H04L 49/90; H04L 47/32; H04L 47/2441; H04L 47/225; H04L 43/50
See application file for complete search history.

(56) References Cited

U.S. PATENT DOCUMENTS 7,114,181 B2    9/2006    Ramaiah et al.
7,155,634 B1 *  12/2006  Le Graverand ..... G06F 11/1076
                                                   714/6.24
(Continued)

FOREIGN PATENT DOCUMENTS

EP    2007080 A2 *  12/2008    ............ H04L 47/27

OTHER PUBLICATIONS

Ptacek, Thomas H. et al. "Insertion, Evasion, and Denial of Service: Eluding Network Intrusion Detection." Secure Networks Inc. Jan. 1998. 66 pages.

(Continued)

*Primary Examiner* — Shawnchoy Rahman
(74) *Attorney, Agent, or Firm* — 2SPL Patent Attorneys PartG mbB

(57) ABSTRACT

A given packet of the packetized data flow of packets is received. The given packet (145) is selectively discarded depending on at least one of the flow history of the packetized data flow and up pseudorandom test. In some embodiments, the selectively discarding is selectively executed of the given packet is at least partially overlapping with at least one further packet of the packetized data flow. Such techniques may find particular application in network-based intrusion prevention systems.

20 Claims, 9 Drawing Sheets

(51) Int. Cl.
*H04L 12/815* (2013.01)
*H04L 12/851* (2013.01)
*H04L 12/823* (2013.01)
*H04L 12/861* (2013.01)

(52) U.S. Cl.
CPC .......... *H04L 47/2441* (2013.01); *H04L 47/32* (2013.01); *H04L 49/90* (2013.01); *H04L 63/1408* (2013.01); *H04L 63/1416* (2013.01)

(56) References Cited

U.S. PATENT DOCUMENTS

| | | | |
|---|---|---|---|
| 10,177,997 B1* | 1/2019 | Bromberg | H04L 43/04 |
| 2003/0048793 A1 | 3/2003 | Pochon et al. | |
| 2006/0126510 A1* | 6/2006 | Russell | H04L 1/0083 |
| | | | 370/235 |
| 2014/0297907 A1* | 10/2014 | Kurosaki | H04L 49/90 |
| | | | 710/57 |

OTHER PUBLICATIONS

Cheng, Tsung-Huan et al. "Evasion Techniques: Sneaking through Your Intrusion Detection/Prevention Systems." IEEE Communications Surveys & Tutorials, Accepted for Publication. 2011. 10 pages.
Taleck, Greg. "Ambiguity Resolution via Passive OS Fingerprinting." NFR Security, Inc. 2004. 8 pages.
International Search Report dated Jun. 1, 2016 for International Application PCT/EP2015/071580.
Cheng, Tsung-Huan et al. "Evasion Techniques: Sneaking through Your Intrusion Detection/Prevention Systems."IEEE Communications Surveys & Tutorials, vol. 14, No. 4, Fourth Quarter 2012. 10 pages.
Vutukur, Mythili et al. "Efficient and Robust TCP Stream Normalization." IEEE. May 18-22, 2018. 15 pages.
Shankar, Umesh et al. "Active Mapping: Resisting NIDS Evasion Without Altering Traffic." IEEE. May 11-14, 2003. 18 pages.
Watson, David et al. "Protocol Scrubbing: Network Security through Transparent Flow Modification." IEEE. 2001. 11 pages.
Varghese, George et al. "Detecting Evasion Attacks at High Speeds without Reassembly." SigComm '06. Sep. 11, 2015. Pisa, Italy. 12 pages.

* cited by examiner

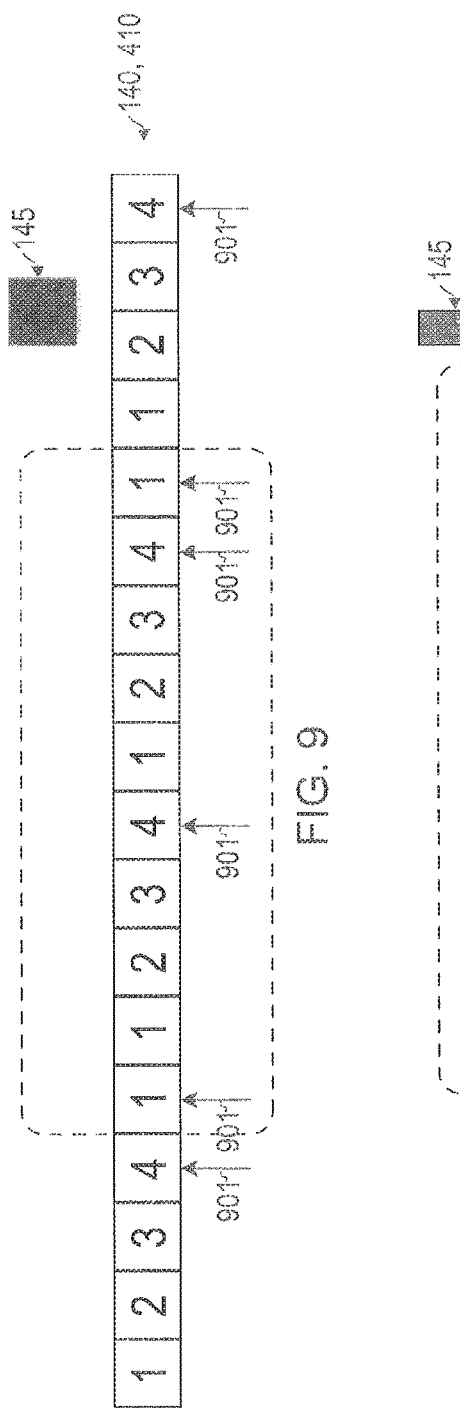
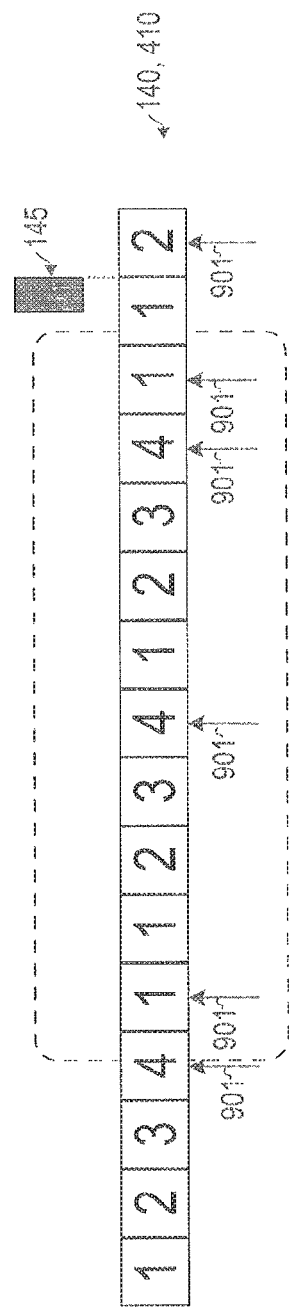
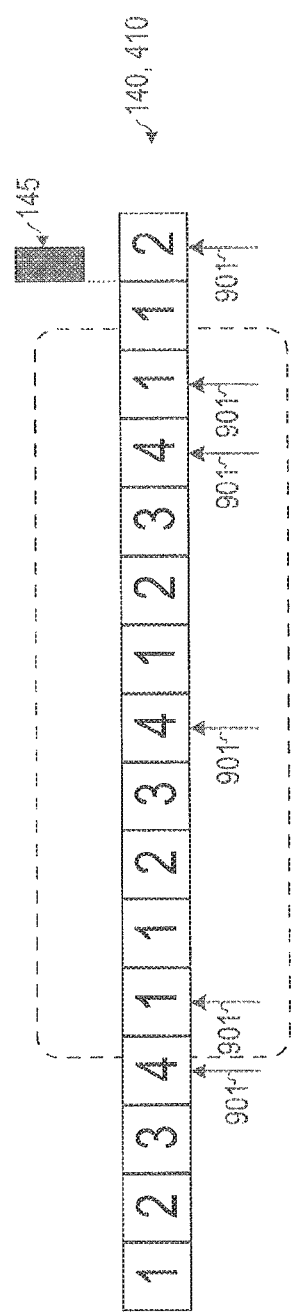
FIG. 9
FIG. 10
FIG. 11

INTRUSION PREVENTION

This application is a National Phase entry application of International Patent Application No. PCT/EP2015/071580 filed Sep. 21, 2015, entitled "INTRUSION PREVENTION" in the name of Shiva Shankar Subramanian et al. and is hereby incorporated by reference in its entirety.

TECHNICAL FIELD

Various embodiments relate to a network node configured to selectively discard a given packet of a packetized data flow depending on at least one of a flow history of the packetized data flow and a pseudorandom test.

BACKGROUND

Intrusion prevention systems (IPS) monitor a network for malicious activity, e.g., by blocking and alerting administrators regarding potential network attacks. Deep packet inspection (DPI) methodologies are often used in IPS to match transport layer payload with a database of a pre-defined pattern which defines an attack (signatures). IPS is sometimes differentiated into host-based intrusion prevention systems (HIPS) and network-based intrusion prevention systems (NIPS) depending on where in the network they are deployed. If the IPS is deployed in an end host, i.e., a target node or source node, then it often is referred to as HIPS: A typical example is an antivirus system found in the end host systems. On the other hand, NIPS is deployed in an intermediate network device like a router whose primary functionality is forwarding the network packets to the right destination port.

In certain scenarios in NIPS, NIPS can accept a packet of a packetized data flow through the network for DPI which the end host rejects (insertion attack); and on the other hand, the NIPS may not process a packet which the end host processes (evasion attack). Insertion and evasion attacks belong to a category of attacks targeting the NIPS, so that the attacks focused on end hosts are not identified by the NIPS. Since NIPS typically use passive monitoring techniques to recognize patterns of signatures in network traffic, attackers can take advantage of ambiguities in network protocol implementations to deceive them. The premise in creating these attacks is to introduce an ambiguity in packet processing before or during DPI between the NIPS and the end host. Insertion and evasion attacks have to be addressed by NIPS due to their passive monitoring of the networks and algorithms to identify these attacks will enhance the quality of DPI in them. Table 1 outlines various ways through which both insertion and evasion attacks can be created by attackers at various layers.

TABLE 1

Description of various evasion attack techniques

| Technique | Layer | Comments |
|---|---|---|
| Uncommon Protocol Fields | >L2 | NIPS processes a packet with uncommon protocol field combination while end victim does not |
| Obfuscation and Encryption | >L4 | Transformation of malicious packet payloads into semantically equivalent ones. E.g.: URI hexadecimal encoding |
| Denial of Service (DoS) | L2/L3/L4 | DoS attack intends to overwhelm network bandwidth or system resources such as CPU or memory by injecting packets |
| Packet Splitting Techniques | L3/L4 | Signature split across multiple packets Overlapping packets with signature splitting techniques |

Attacks based on techniques like uncommon protocol fields, obfuscation, and encryption-based can often be identified through meticulous packet processing in NIPS. Special consideration has to be given to those algorithms implemented in NIPS in their architecture stages to make them DoS proof.

However, attacks based on packet splitting techniques are quite challenging to identify as packet reassembly is not a primary task of NIPS because of which they can be used to mask other attacks. Thus algorithms which can efficiently identify attacks based on packet splitting techniques are fundamental for NIPS and enhance the quality of signature matching process in DPI.

Packet splitting attacks can be created by attackers in various ways. In simple scenarios, an attack packet with a signature is split into multiple smaller packets and sent out of order so that the NIPS cannot identify the attack. However, in such a scenario, effective reassembly algorithms may be able to identify such an attack. In some complex scenarios, an overlap attack is created by sending duplicate copies of packets representing same IP fragments or TCP segments with different content in the data portion of the packet with only one version of the packet containing a signature or a portion of the signature; here, complete overlapping of the duplicate packets results. Partial overlapping of packets is another way through which evasion attacks are created whereby partial portions of the packets overlap to confuse the NIPS.

Different operating systems reassemble duplicate and overlapping packets in a different way which makes overlap attacks very difficult to process for NIPS. Adequate delays injected by attackers between overlapping or duplicate packets makes the process of detecting these attacks more difficult.

Techniques are known to provide countermeasures against attacks based on overlapping packets (overlap attack).

A detailed overview of security related shortcomings of TCP, IP protocol suite was documented in T. H. Ptalek and T. N. Newsham, "Insertion, Evasion and Denial of Service: Eluding Network Intrusion Detection," (1998), in which four commercially available NIPS were analyzed. The results showed that fragmentation-based attacks creating overlapping packets are mostly not handled by the NIPS systems resulting in the potential of successful evasion attacks. A detailed analysis of various techniques against overlap attacks is mentioned in T.-H. Cheng and Y.-D. L. Y.-C. L. P.-C. Lin, "Evasion Techniques: Sneaking through you Intrusion Detection/Prevesion systems," *IEEE, Communications Surveys and Tutorials*, 14 (2012), 1011-1020. Solutions for overlap attacks have been broadly categorized into flow-modification techniques and operating system (OS) fingerprinting techniques through which networking policies of destination could be identified.

Flow modification techniques typically remove the ambiguity by picking up one interpretation of the packet in case of overlap attacks; other packets are discarded. So-called Protocol Scrubbing, see D. Watson, M. Smart, G. R. Malan and F. Jahanian, "Protocol Scrubbing: network security through transparent flow modification," IEEE/ACM Transactions on Networking, 12 (2004) 261-273, implements a transport scrubber which picks up one interpretation of the protocols and converts incoming flows into a single representation that all endpoints will universally accept. The scrubber maintains a copy of the byte stream sent by sender, but not acknowledged by the receiver and discards packets that could lead to inconsistencies in the byte stream.

A TCP based overlap detection method is proposed in patent publication U.S. Pat. No. 7,114,181. This implementation introduces the idea of using expected sequence number which is the sequence number of the next in-order packet. If the sequence number of the incoming packet is not the same as the expected sequence number, then the packet is placed in an out-of-order buffer. For every new packet which matches the expected sequence number, a comparison is done with those packets placed in the out-of-order buffer and if an overlap is observed, the packet in the out-of-order buffer is discarded. Both implementations mentioned above need comparably large amounts of memory to store the packets which can be well utilized by the attackers to create memory-based DoS attacks which flood the buffer with data.

To alleviate this problem of high memory needs, M. Vutukuru, H. Balakrishnan and V. Paxson, "Efficient and Robust TCP Stream Normalization," Proc. IEEE Symposium on Security and Privacy, Oakland (2008) presents an algorithm in which instead of storing the packets directly in the memory, a hash of the payload is computed and stored in the memory and used for further analysis. Even though this is a comparably memory efficient way, processor utilization is very high due to the implementation of hashing techniques.

The second category to address overlap attacks uses fingerprinting techniques to gather information about clients connected to the network so that ambiguity with respect to reassembly can be removed. A method called active mapping was proposed in S. U and P. V, "Active Mapping: resisting NIDS evasion without altering traffic," in Proc. Symposium on security and privacy (2003). Here, probe packets are sent to client machines connected to NIPS to identify their operating systems and the NIPS can process data depending on the client. But the probing packets can be quite noisy and be blocked by the firewall of the end node victim.

A passive OS fingerprinting method was proposed in G. Taleck, "Ambiguity resolution via passive OS fingerprinting," in Proc. International conference on recent advances in intrusion detection (2003). Here, passive methods by observing patterns in network protocol header fields are used to identify the OS of the end node victim. The above implementation suffers from a cold start problem and is error prone in certain scenarios where the users may change the default behavior of the OS.

Thus, prior art techniques such as those relying on buffering unacknowledged data and out-of-order data, respectively, often suffer from memory exhaustion and can be a source for DoS attacks. Other techniques require comparably large processing resources for calculating the hash for each and every incoming byte. Fingerprinting techniques can remove ambiguities of data reassembly, but managing information about end nodes can be a tedious process for network administrators. Also, the predictability in processing network data in case of duplicate and overlap packets can be used by attackers along with other evasion techniques mentioned above to create evasion attacks.

SUMMARY

Therefore, a need for advanced techniques for protection against overlap attacks exists. In particular, a need exists for techniques which overcome or alleviate at least some of the above-mentioned limitations and drawbacks. In particular, a need exists for techniques addressing the disadvantages of the above implementations—while not compromising on the performance and storage requirements.

This need is met by the features of the independent claims. The dependent claims define embodiments.

According to an aspect, a network node is provided. The network node comprises an interface. The interface is configured to communicate with at least one further network node employing the packetized data flow of packets. The network node further comprises at least one processor configured to receive, via the interface, a given packet of the packetized data flow. The at least one processor is configured to selectively discard the given packet depending on at least one of a flow history of the packetized data flow and a pseudorandom test.

According to an aspect, a method is provided. The method comprises receiving a given packet of the packetized data flow of packets. The method further comprises selectively discarding the given packet depending on at least one of the flow history of the packetized data flow and a pseudorandom test.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

FIG. 4 schematically illustrates the packetized data flow and further schematically illustrates a moving window implemented as a split list, the split list distinguishing between the packets of the packetized data flow having been received in a receive buffer of the router and the holes in the sequence identification space of the packets of the packetized data flow having been received in the receive buffer, wherein FIG. 4 illustrates the situation before an in-order incoming packet has been added to the moving window.

FIG. 5 generally corresponds to FIG. 4, wherein FIG. 5 illustrates the situation after the in-order incoming packet has been added to the moving window.

FIG. 6 schematically illustrates the packetized data flow and further schematically illustrates a moving window implemented as a split list, the split list distinguishing between the packets of the packetized data flow having been received in a receive buffer of the router and the holes in the sequence identification space of the packets of the packetized data flow having been received in the receive buffer, wherein FIG. 6 illustrates the situation before an out-of-order incoming packet has been added to the moving window.

FIG. 7 generally corresponds to FIG. 6, wherein FIG. 7 illustrates the situation after the out-of-order incoming packet has been added to the moving window.

FIG. 9 schematically illustrates a flow history of the packetized data flow, wherein FIG. 9 illustrates a number of in-order packets of the packetized data flow having been sequentially received in the receive buffer in order of the corresponding sequence identifications.

FIG. 10 generally corresponds to FIG. 9.

FIG. 11 generally corresponds to FIG. 9.

DETAILED DESCRIPTION OF EMBODIMENTS

Figure 1:
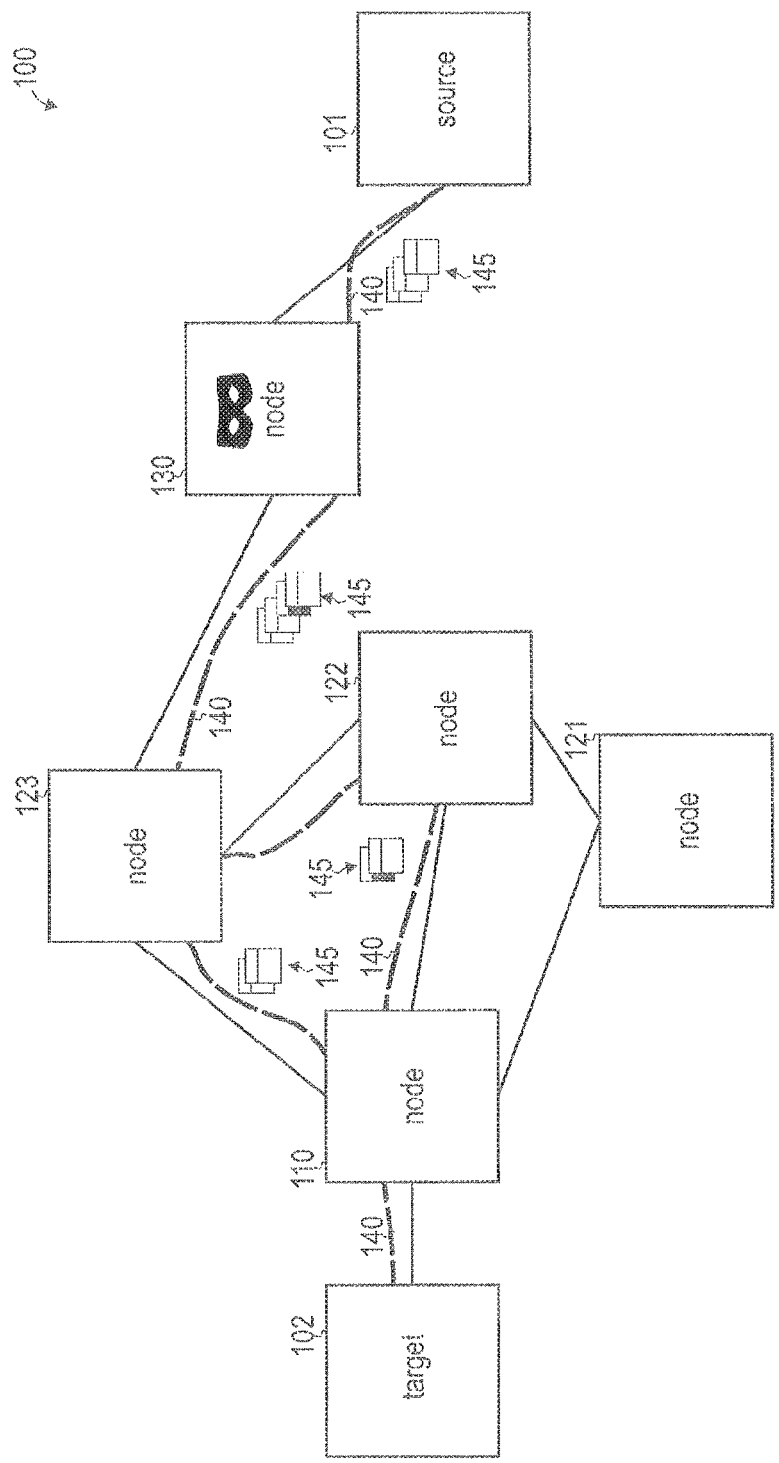
FIG. 1 is a schematic illustration of a network comprising a plurality of routers, a source node, and a target node, wherein a packetized data flow of packets establishes communication via the routers between the source node and the target node.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of selectively discarding a given packet of the packetized data flow through a network are discussed. Selectively discarding relates to a scenario where the given packet is either discarded or not discarded—depending on certain decision criteria. The decision criteria for selectively discarding the given packet may be selected from the group comprising: a flow history of the packetized data flow; and a pseudorandom test.

The flow history of the packetized data flow may correspond to a series of events triggered at the respective node by the packetized data flow; e.g., a sequence of incoming packets, a number of overlapping packets, an average size or length of packets, an average bit error rate, an average packet error rate, a number of in-order and out-of-order packets, etc. all may contribute to the flow history.

The pseudorandom test may correspond to a test that exhibits statistical randomness while being in a deterministic process, e.g., based on machine parameters of the respective network node and/or based on properties of the packetized data flow.

Where a poisonous packet is not forwarded (discarded), e.g., by flushing the packet or deleting it, potential harm done by a signature included in the packet can be prevented. An overlap attack may be averted. By employing at least one of the flow history of the packetized data flow and the pseudorandom test as a decision criterion for said selectively discarding, an effective and yet computationally inexpensive technique of intrusion prevention—which is difficult to compromise by an attacker—can be implemented.

In particular, the techniques described herein may be applied in NIPS; here, the techniques may be implemented by a forwarding node, i.e., a router 110 (cf. FIG. 1), deployed in the network 100 along the packetized data flow 140 of packets 145, somewhere in-between a source node 101 and a target node 102. Preferably, the router 110 is deployed closed to the target node 102. Intrusion by an attacker node 130 into the target node 102 may thus be prevented (in FIG. 1 shown by the black packet 145 inserted into the packetized data flow 140 and carrying a poisonous signature in its payload). The router 110 is deployed in-between the attacker node 130 and the target node 102.

Generally, the packetized data flow 140 may allow for unidirectional transmission or bidirectional transmission—sometimes referred to as employing two opposing half connections—of higher-layer data included in the data packets 145. The packetized data flow 140—on its way through the network 100 from the source node 101 to the target node 102—may branch out and take multiple routes along different routers 121-123; here, different packets 145 of the packetized data flow 140 may take different routes through the network 100. Transmission in the network 100 may be fixed-line transmission and/or wireless transmission.

While, generally, based on the techniques described herein various kinds and types of attacks may be addressed, in various embodiments overlap attacks can be prevented based on the techniques described herein: here, it is possible to selectively execute said selectively discarding if the given packet is at least partially overlapping with at least one further packet of the packetized data flow. Two packets that are overlapping may occupy a common area of a sequence identification space of the sequence identifications of the packets of the packetized data flow. Where the common area of the sequence identification space of the sequence identifications of the packets of the packetized data flow fully (partially) coincides with length of the overlapping packets, the packets may be referred to as being fully overlapping duplicates (partially overlapping). Hence, said selectively discarding of the given packet may, in certain scenarios addressing overlap attacks, be executed if and only if it is determined that the given packet is at least partially overlapping with the at least one further packet.

The techniques can be implemented in various processing layers, e.g., according to the Open Systems Interconnection (OSI) protocol. E.g., the techniques may be implemented in the network layer and/or the transport layer: Correspondingly, it is possible that the packets of the packetized data flow art Transmission Control Protocol (TCP) segments or Internet Protocol (IP) datagrams. The packet identification, offset, packet length and fragmentation flags could be used in case of network layer for IP datagrams as a sequence identification; while the sequence number of a TCP packet could be used for transport layer as the sequence identification. For illustrative purposes and to explain the algorithm, TCP is preferably referenced to hereinafter; however, corresponding techniques can be readily applied to other types of packets with minor modifications, e.g., to IP datagrams.

Figure 2:
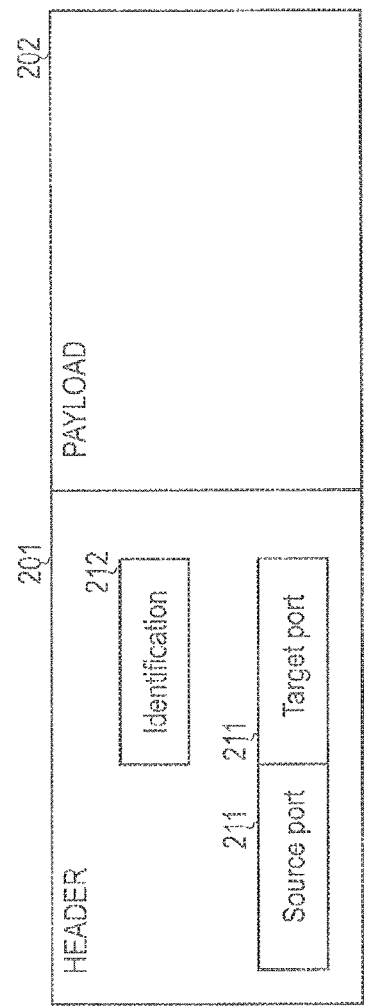
FIG. 2 is a schematic illustration of a given packet of the packetized data flow, wherein the given packet comprises a header and a payload, wherein the header comprises a sequence identification of the packet in form of a sequence number.

For illustrative purposes, in FIG. 2, a packet 145 in the form of a TCP segment is shown. The TCP segment 145 comprises of a header 201 and payload 202. The payload 202 may carry higher-layer data. The header 201 comprises control data including TCP sequence number 212 which is used to uniquely identify and timestamp the packet. As such, the sequence number 212 is a sequence identification identifying the position of the TCP segment 145 in the data flow 140. A source port 211 and a destination port 211 uniquely identify the higher layer application carried by the payload 202. The TCP segment 145 is encapsulated in an IP datagram (not shown in FIG. 2) which gives information about the source and destination IP address from where the packet originates and to where the packet is destined to.

Figure 3:
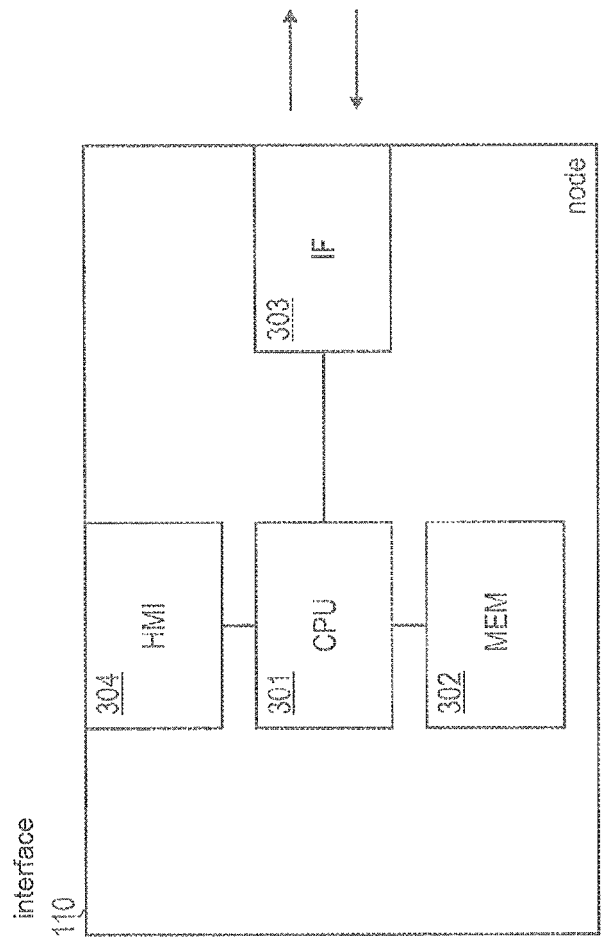
FIG. 3 is a schematic illustration of a router of the network which implements NIPS.

In FIG. 3, the router 110 implementing the techniques described herein is schematically shown at greater detail. The router 110 comprises a processor 301, a memory 302, an interface 303 configured to communicate with at least one further network node 102, 121-123 of the network 100, and a human machine interface 304 configured to input information from a user and output information to a user. The memory 302 is configured to implement a receive buffer for packets 145 of the packetized data flow 140 received via the interface 303. The receive buffer may be used for temporarily storing the packets 145 of the packetized data flow 140; additionally, the receive buffer may indicate a sequence with which the various packets have been received.

Further, control instructions may be stored in the memory 302 which may be a non-volatile memory. When the processor 301 executes the control instructions, the processor may execute techniques of intrusion prevention described herein. Such techniques are illustrated hereinafter in greater detail.

In various scenarios, a moving window-based intrusion prevention against overlap attacks is implemented. The moving window identifies packets of the packetized data flow. Alternatively or additionally, the moving window identifies holes in the sequence identification space of the packets 145 having been received in the receive buffer. Based on the moving window, it is possible to determine whether a given packet 145 is at least partially overlapping with at least one further packet, i.e., is partly overlapping or a duplicate. For sake of simplicity, hereinafter the term overlapping covers, both, partly overlapping and duplicate packets unless expressly noted otherwise.

The moving window, e.g., stores information extracted from TCP packet header 201 using a split list data structure; here, the split list may distinguish between the packets 145 of the packetized data flow 140 having been received in the receive buffer and the holes in the sequence identification space of the packets 145 of the packetized data flow 140 having been received in the receive buffer.

Figure 4:
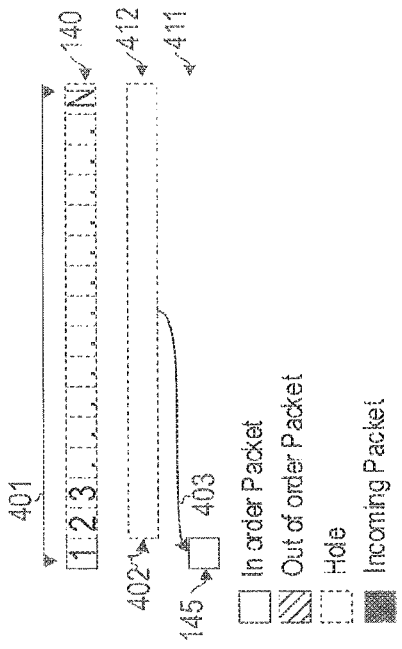

Thus, referring to FIG. 4, the moving window 401 of a given packetized data flow 140 may be structured as a split list which is organized into packet list 411 and hole list 412. The size of the moving window 401 may be fixed and the window may move or slide to store information about incoming packets 145 over time. The packet list 411 and hole list 412 contain information about the sequence identifications 212 and the lengths of the packets 145 and holes, respectively.

This information may be used to perform identify overlapping packets; additionally, this information may be used for packet reassembly while the original 145 packet is stored in the memory 302. The information from the header 201 for each incoming packet 145 is checked with the split list 411, 412 of the moving window 401 to identify overlapping packets 145. Depending on whether an overlapping packet 145 is identified or not, the packets 145 can be forwarded for further processing—or be discarded if the incoming packet 145 is identified as a overlapping packet 145 (overlap processing).

Generally, various techniques can be employed for selectively discarding a given packet 145, e.g., if it overlaps with at least one further packet, thereby removing ambiguities and preventing intrusion based on an overlap attack.

In some scenarios, the following technique is employed for selectively discarding the given packet:

First, try to discard one or multiple packets in the overlap region by comparing the given packet 145 with the following flow history parameters of the packetized data flow: local average of an in-order packet counter, i.e., a counter to keep track of the number of in-order packets before being broken by an out-of-order packet; and a packet length of adjacent packets Second, if a decision cannot be taken based on the flow history as illustrated above, drop packets in the overlap region using a pseudorandom test, the pseudorandom test being based on, e.g., a parity generation.

By using the discarding mechanism as mentioned above, a decision is taken in a pseudorandom way in case of overlap processing. Since packet length and in-order counters are dependent on the flow statistics at that moment of time, it is difficult to guess them making it difficult to compromise the system. A security can be increased. If a decision cannot be made based on the flow history of the packetized data flow 140, the packets 145 are discarded in a pseudorandom way—which again cannot be predicted by attackers. The memory needed is lesser when compared with other flow modification techniques as information on a fixed number of packets 145 is only maintained.

Figure 5:
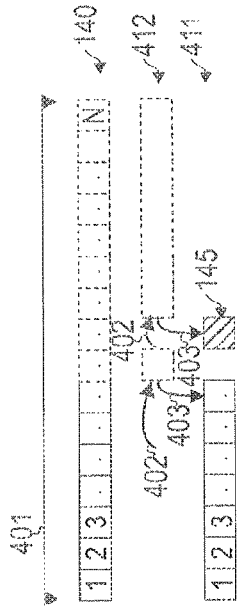

Determining Overlapping Packets by Moving Window:

Still referring to FIG. 4, details of the split-list structure of the moving window 401 are discussed. As mentioned, the moving window 401 maintains separate lists 411, 412 using the split list data structure to keep track of packets 145 and holes, respectively. The split list allows for a reduction in search complexity if compared to a single list; this is achieved by providing vertical connectivity between multiple lists by means of vertical pointers 403 (cf. FIG. 5).

A list entry in the packet list 411 contains the sequence identification 212 and the packet length for the corresponding packet 145. A hole is a void in the packet sequence or sequence identification space created on an arrival of an out-of-order packet. The list entry in the hole list 412 contains the sequence identification and the length of the hole. The length of the hole may be computed by subtracting the sequence identification 212 of the packets 145 which are on the either sides of the hole and the starting sequence identification 212 of the hole may be computed from the length and the starting sequence identification of the packet before the hole.

On the arrival of a packet 145, a search is performed based on the flow information 211. If an instance of the moving window 401 corresponding to the specific packetized data flow 140 exists, then the packet list 411 or the hole list 412 is updated depending on the comparisons made based on the sequence identification 212 and the packet length of the incoming packet 145. A new instance of the moving window 401 is created if an instance is not available for the flow information 211 of the specific packetized data flow 140.

Each moving window 401 may maintain a current pointer 402 which points to the first hole in the moving window 401 with the assumption that the incoming packet 145 always fills the first hole in the system and the updating process in the list always starts from this.

Each moving window 401 may be associated with an expected sequence identification. The expected sequence identification is the sequence identification of the next packet expected to arrive for the corresponding packetized data flow 140. If the sequence identification 212 of the next incoming packet 145 belonging to the packetized data flow 140 matches the expected sequence identification, the packet 140 is termed as an in-order packet and the in-order counter is incremented by One from the previous list entry. If the sequence identification 212 of the incoming packet 145 doesn't match the expected sequence identification, the packet is termed as an out-of-order packet and the in-order counter is reset to One.

So in the process of construction of a moving window, all incoming packets 145 are either classified as an in-order packet, out-of-order packet, or an overlapping packet. FIG. 4 illustrates a new moving window 401 created for a packetized data flow 140. So far, no packets 145 have been added to the window 401 and, thus, the window 401 is empty. However, there is a new incoming packet 145 (illustrated in black in FIG. 4). The incoming packet 145 is in-order as it is received at the position of the pointer 402 and as the expected sequence identification. A corresponding entry is added to the packet list 411 and the hole list 412 is updated accordingly, see FIG. 5.

Figure 6:
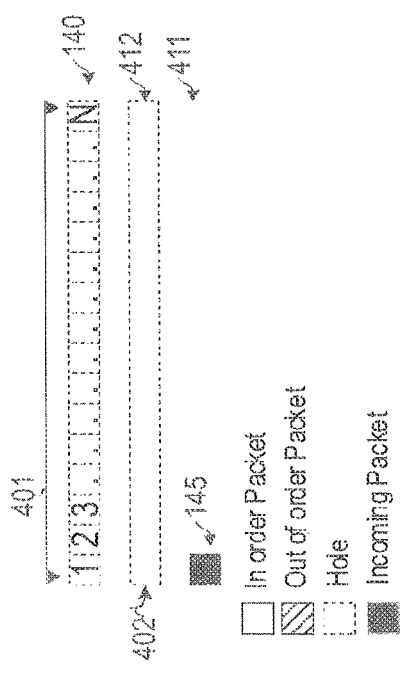
Figure 7:

FIG. 6 illustrates a scenario where the incoming packet is out of order, i.e., the pointer 402 does not point to the sequence identification 212 of the incoming packet 145; FIG. 7 illustrates the situation after the moving window 401 has been updated.

Figure 8:
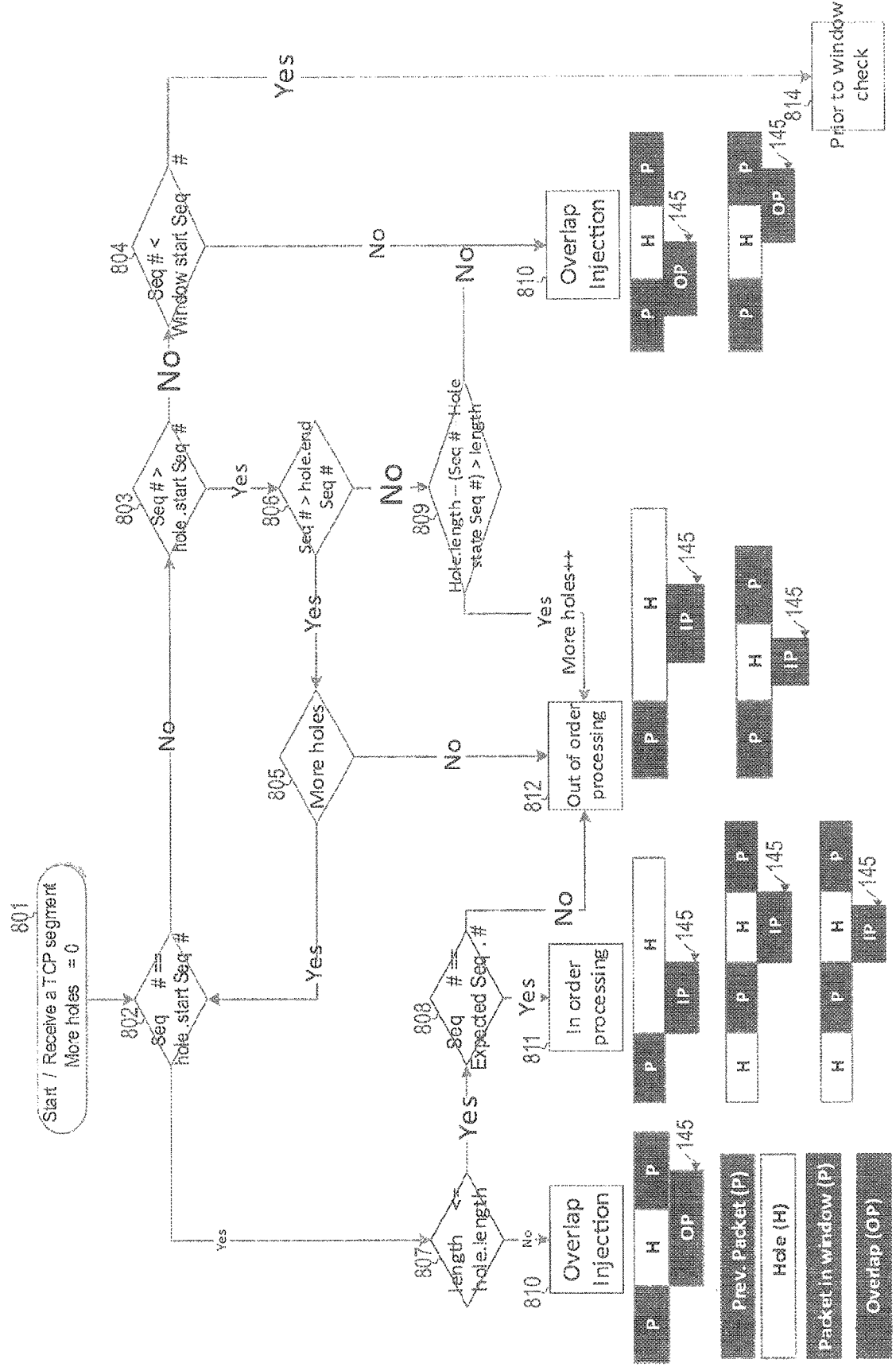
FIG. 8 is a flowchart of techniques of determining whether a given packet of the packetized data flow is at least partially overlapping with at least one further packet by employing a moving window which identifies the packets of the packetized data flow.

FIG. 8 is a flowchart illustrating the process for maintaining the moving window 401. At 801, a new incoming packet 145 is received. "More holes" is a counter which keeps track of the number of holes in the moving window while it is initialized to ZERO when a new moving window is created.

At 802, it is checked whether the sequence identification 212 of the incoming packet 145 equals the start sequence identification of the hole pointed by the hole pointer 402.

If this is the case, at 807, it is checked whether the length of the incoming packet 145 is smaller than or exactly equal to the length of the hole in the hole list 412. If this is not the case, then the incoming packet 145 is identified as overlapping, 810 (in FIG. 8, the corresponding situation is illustrated with the incoming packet 145 is longer than the hole).

If, however, at 807 it is determined that the length of the incoming packet 145 is smaller or equal than the length of the hole in the hole list 412, it is checked whether the sequence identification 212 of the incoming packet 145 is the expected sequence identification of the next incoming packet, 808. If this is the case, the incoming packet 811 is in-order (in FIG. 8, three corresponding scenarios are shown where the lower boundary of the incoming packet 145 matches the sequence identification of the hole pointed to by pointer 402 and the incoming packet 145 is either smaller or just as long as the hole in the hole list 412).

If, however, at 808, the expected sequence identification does not match the sequence identification of the incoming packet 145, the incoming packet 145 is labeled as out-of-order, 812. This scenario will typically occur when there are multiple holes in the moving window, and two consecutive packets fill different holes either completely or partially.

If, at 802, the sequence identification 212 of the incoming packet 145 does not match the sequence identification of the hole pointed to by the hole pointer 402, it is next checked, at 803, if the sequence identification 212 of the incoming packet 145 is larger than the starting sequence identification of the hole pointed to by pointer 402. If this is not the case, it is checked, 804, if the sequence identification 212 of the incoming packet 145 is smaller than the lower boundary of the moving window 401, 804; in the affirmative, the incoming packet 145 is below the moving window 401 and may be processed accordingly, 814.

If, however, at 804, it is judged that the sequence identification 212 of the incoming packet 145 is not below the lower boundary of the moving window 401, the incoming packet 145 is identified as overlapping, 810 (in FIG. 8, e.g., a corresponding scenario is shown where the lower boundary of the incoming packet 145 is below the lower boundary of the hole in the hole list 412; this is the first inset below 810 in FIG. 8).

If, at 803, it is determined that the sequence identification 212 of the incoming packet 145 is larger than the starting sequence identification of the hole pointed to by pointer 402, at 806 it is checked whether the sequence identification 212 of the incoming packet 145 is larger than the upper boundary of the hole in the hole list 412. If this is the case, at 805, it is checked if there are more holes; the affirmative, step 802 is executed anew with a new current hole having a higher sequence identification than the previous hole. If, however, at 805 it is determined that there are no further holes in the hole list 412, the incoming packet is labeled as out-of-order, 812 (a pictorial representation of this is shown in the first inset below 812 of FIG. 8).

If, at 806, it is determined that the sequence identification 212 of the incoming packet 145 is not larger than the upper boundary of the hole, then, at 809, it is checked whether the length of the hole subtracted by a distance between the lower boundaries of the incoming packet 145 and the hole is larger than the actual length of the packet. The difference between the hole length and the lower boundaries of the sequence identifications of the packet 145 and the start sequence identification of the hole gives the maximum possible length which the packet can occupy and this typically has to be greater than the length of the incoming packet 145. If this is not the case, the incoming packet 145 is identified as overlapping, 810 (illustrated by the second inset below 810 in FIG. 8) Otherwise, the incoming packet 145 is identified as out-of-order, 812. (illustrated in second inset below 812 in FIG. 8)

As can be seen from the above, employing the moving window 401 allows for the identification of overlapping packets in the packetized data flow 140, see 810. Hereinafter, the case of interest is where the incoming packet has been identified as overlapping, 810. Where the incoming packet 145 has been identified as overlapping, it is subject to being selectively discarded depending on the flow history and/or the pseudorandom test.

Discarding Packets Depending on Flow History:

Once packets 145 have been identified as overlapping packets 145 from the moving window method (cf. FIG. 8: 810), information extracted from the flow history of the packetized data flow 140 can be used to discard packets 145 from the corresponding overlap region to remove the ambiguity.

E.g., the flow history may comprise an average number of packets of the packetized data flow 140 having been sequentially received in the receive buffer in order of the corresponding sequence identifications 212. I.e., it is possible to consider how many packets, on average, have been sequentially received in the past. This check may be implemented, in exemplary embodiments, by the in-order counter 901 (cf. FIG. 9). E.g., it may be possible to compare the latest in-order counter 901 of the overlap region with the moving average of previous "y" in-order counters 901. To keep computation simple, "y" may be chosen in powers of 2, like 2, 4 or 8. For example, FIG. 9 shows an incoming overlapping packet 145 in black; the packet 145 is overlapping with two further packets (labeled 2 and 3 in FIG. 9) which belong to an in-order packet sequence. The values of the in-order counter 901 are: 4; 1; 4; 4; 1; 4.

The latest and most-recent in-order counter 901, which has a value of 4, is compared with the values of the previous four (y=4) in-order counters 901 reading 1, 4, 4 and 1; an average thereof is computed which is 2.5. Since the in-order counter of the current sequence which contains the incoming overlapping packet 145 is bigger, here 4, than the average in-order sequence before it, here 2.5, the incoming packet 145 is discarded.

Hence, as can be seen from the above, generally it is possible that the given packet 145 is discarded depending on the flow history if the average number of packets 145 of the packetized data flow 140 having been sequentially received in the receive buffer in order of the corresponding sequence identifications 212 is larger than a number of packets adjacent to the given packet 145 in the packetized data flow 140 and having been sequentially received in the receive buffer in order of the corresponding sequence identifications 212.

Alternatively or additionally to the average number of in-order packets as described above, it is also possible to take into account the length of packets 145 of the packetized data flow 140 as the flow history. E.g., the given packet 145 may be discarded depending on the flow history if the length of the given packet 145 differs from the length of at least one packet 145 adjacent to the given packet 145 in the packetized data flow 140. E.g., if the average value of the in-order counters 901 is greater than the value of the current in-order counter 901, then the length of the overlapping incoming packet 145 may be compared with the length of the adjacent packet 145. In some scenarios, this test is applied if and only if one of the packet boundaries of the overlapping packets 145 match as depicted in FIG. 10.

Hence, in some scenarios said selectively discarding may depend on the flow history if a boundary of the given packet 145 matches a boundary of at least one further packet. If this is not the case, the pseudorandom test may be employed as will be described in greater detail below.

If the boundaries match (cf. FIGS. 10 and 11), one of the packets 145 in the overlap region whose length matches the adjacent packet is retained; while the other packet—having a deviating length—is discarded. In the scenario of FIGS. 10 and 11, the incoming overlapping packet 145 has a smaller length than the other packets and is thus discarded.

If a decision cannot be taken based on the length, the packets 145 are dropped using the pseudorandom test described next. Similarly, if the packet boundaries do not match in the overlapping packets 145, the pseudorandom test is used for discarding.

In-order packet arrival depends on the route which the packet takes to reach from the sender to receiver and, thus, cannot be easily predicted by the attacker; in-order arrival may be seen as a random event. Similarly packet length is something which depends on the specific packetized data flow, either depending on buffer availability or Maximum Transmissium Unit (MTU) requirements imposing limitations on the maximum packet size. So, considering in-order counter and packet length as comparison yardsticks is a good choice to discard packets and also will be random events in real-life implementations.

Regarding the MTU requirements: the packet size for the transmission of data typically depends on the choice of layer 2 protocols. E.g, if the medium for networking is Ethernet, then the Ethernet L2 protocols are used in which the maximum packet size is typically 1518 bytes. In such a scenario, the L4 application sets the packet size of L4 packets to align with L2 packet length specifications. Applications which require high throughput typically utilizes the maximum packet size as required by L2 so that the computational requirements at lower layers is kept to a minimum.

The above-illustrated moving window-based technique allows for reducing the memory consumption of the flow modification based techniques: only a fixed number of packets 145 are stored per packetized data flow 140.

Discarding Based on Pseudorandom Test:

If discarding based on the flow history as mentioned above fails, the pseudorandom test can be executed. The pseudorandom test may use a parity generation to discard single or multiple packets 145 in the overlap region 1200 (cf. FIG. 12). A parity generation algorithm can be used to calculate the even parity on a packet in the overlap region 1200. The parity may be computed on a 32 bit number which is obtained by performing a logical "or" operation on the sequence identification 212 of the packet and a secure key which is specific to the router 110. For example, the secure key could be a static information like a unique device number of the router 110 or a dynamic number like the clock counter of the processor 301 at that instance; such key are specific to the system and may be even specific to the timeframe when the computation is performed and thus make it difficult to compromise the system.

Figure 12:
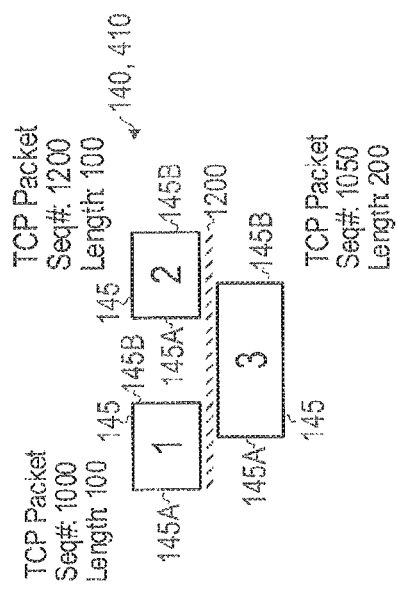
FIG. 12 schematically illustrates an overlap region between three partially overlapping packets of the packetized data stream.

FIG. 12 shows an example of three overlapping packets 145 having lower boundaries 145A and upper boundaries 145B which all do not match. The overlapping can be deduced from the sequence identifications 212 and packet lengths, cf. FIG. 8. The even parity generation algorithm is run on individual packets 145 in the overlap region 1200.

If the result of the even parity computation is a "1", the current packet 145 on which the parity is computed is retained and the other packet which overlaps with the current packet 145 is discarded. If the result of the computation is a "0", then the current packet 145 is discarded and the computation is performed on the next packet.

The even-parity generation algorithm runs for all packets 145 in the overlap region and multiple packets will be discarded depending on the outcome of the algorithm. Table 2 outlines possible ways in which packets can be discarded in case of overlapping packets as seen in FIG. 12.

TABLE 2

|  | Packet 1 | Packet 2 | Packet 3 |
| --- | --- | --- | --- |
| Scenario 1 (S1) | Retained | Discarded | Retained |
| Scenario 2 (S2) | Retained | Discarded | Discarded |
| Scenario 3 (S3) | Discarded | Discarded | Retained |
| Scenario 4 (S4) | Discarded | Retained | Discarded |
| Scenario 5 (S5) | Discarded | Discarded | Discarded |

TABLE 3

| Packet 1 | Packet 2 Parity Combination | Packet 3 | Outcome |
| --- | --- | --- | --- |
| 0 | 0 | 0 | S5 |
| 0 | 0 | 1 | S3 |
| 0 | 1 | X | S4 |
| 1 | X | 0 | S2 |
| 1 | X | 1 | S1 |

Table 3 outlines possible parity combinations which can result from the algorithm and also lists the outcomes connected to the same; here, X represents that the parity cannot be generated for the packet 145 as it's already discarded, because the parity of the preceding packet is 1. It can be seen that the choice of parity combination decides the way the packets 145 will be discarded. The parity generation process depends on the choice of the secure key and the sequence identification of the packet which is also a pseudorandom process which will surely result in a pseudo random way of discarding packets.

Hence, as has been shown above, the pseudorandom test may comprise at least one of a parity associated with the given packet 145, a secure key of the router 110, the sequence identification 212 of the given packet 145, a state of the processor 301, and a clock counter of the processor 301.

In the various scenarios disclosed herein, it is possible that two parameters are considered for computing the parity associated with the given packet 145. E.g., a first parameter may be specific to the sequence identification of the given packet 145, e.g., in case of the TCP segment depend on the sequence number or in case of an IP datagram depend on the fragment offset, identification and/or flag. A second parameter may be dependent on the router 110, i.e., the state of the processor 301. In particular the second parameter may provide the pseudorandomness.

Figure 13:
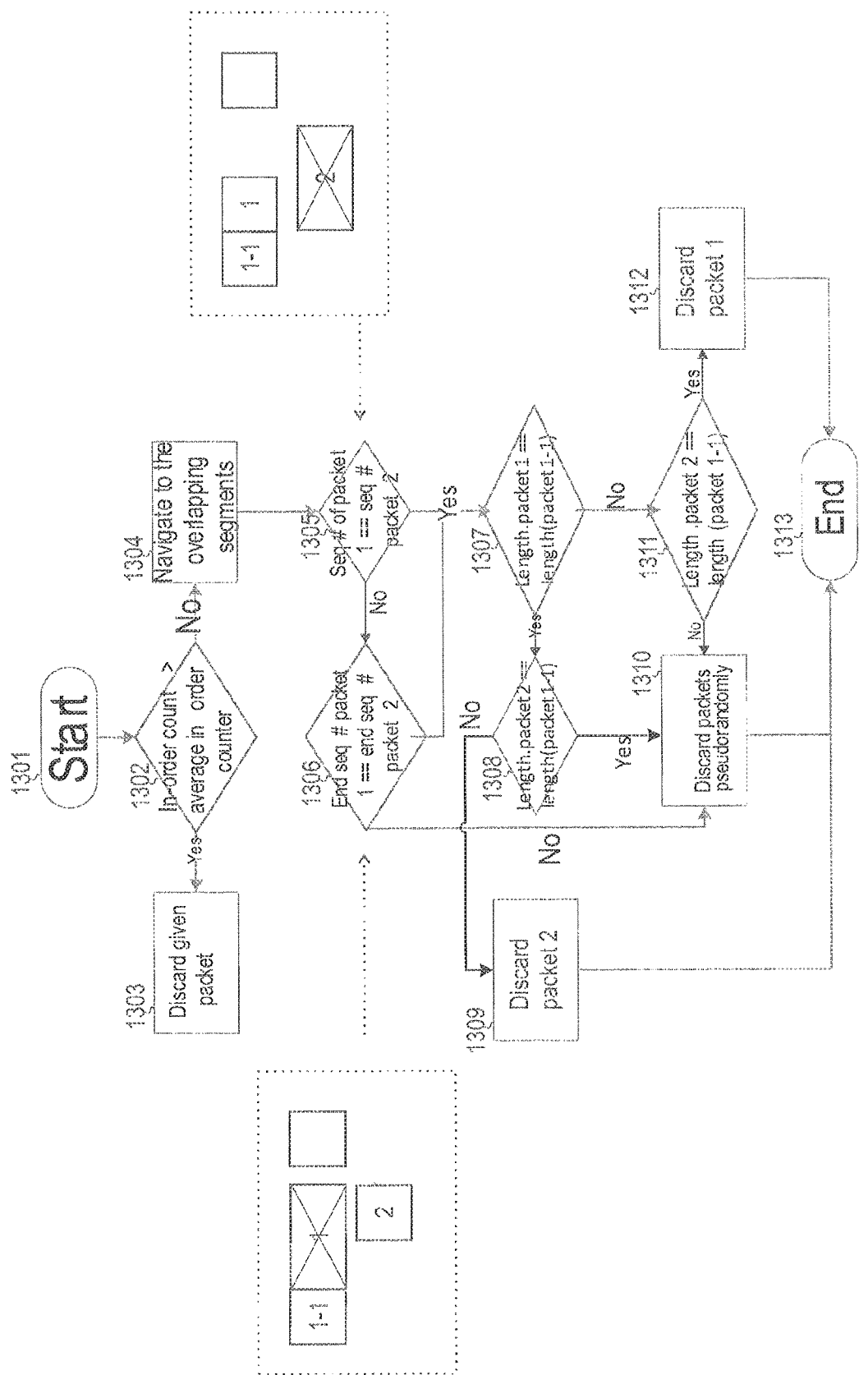
FIG. 13 is a flowchart illustrating techniques of selectively discarding a given packet of the packetized data flow depending on a flow history of the packetized data flow if the given packet is at least partially overlapping with at least one further packet of the packetized data flow.

FIG. 13 is a flowchart illustrating aspects of said discarding depending on the flow history of the packetized data flow 140. At 1301, an incoming packet 145 which has been identified as overlapping (cf. FIG. 8: 810) is received.

First, it is checked whether the current in-order counter 901 has a value which is larger than the average value of previous in-order counter(s) 901, 1302. If this is the case, the incoming packet 145 which has been received and 1301 is discarded, 1303.

Otherwise, the different packets in the overlap region 1200 are identified, 1304. First, it is checked whether the boundaries of the packets (represented as packets "1" and "2" in the insets in FIG. 13) match. This is performed by comparing the start and the end sequence identifications of the overlapping packets, respectively at 1305 and 1306. If neither the start sequence identification nor the end sequence identification of the packets in the overlapping region match, then the pseudorandom test is used to drop the packets, 1310. If the start sequence identification or the end sequence identification of the packets in the overlapping region match, the length of the either of the packets is compared with one of the adjacent packets in the non-overlapping region (represented by packet "1-1" in the insets in FIG. 13), respectively in 1307, 1311 and later 1308. If both the packets fail the test or both satisfy the length requirement test, packets are discarded in a pseudorandom fashion, 1310; if this is not the case, then the packet not having the same length as the chosen common adjacent packet is discarded as in the case of 1312 and 1309 (packet "2" in the right-hand side inset of FIG. 13; packet "1" in the left-hand side inset of FIG. 13).

Figure 14:
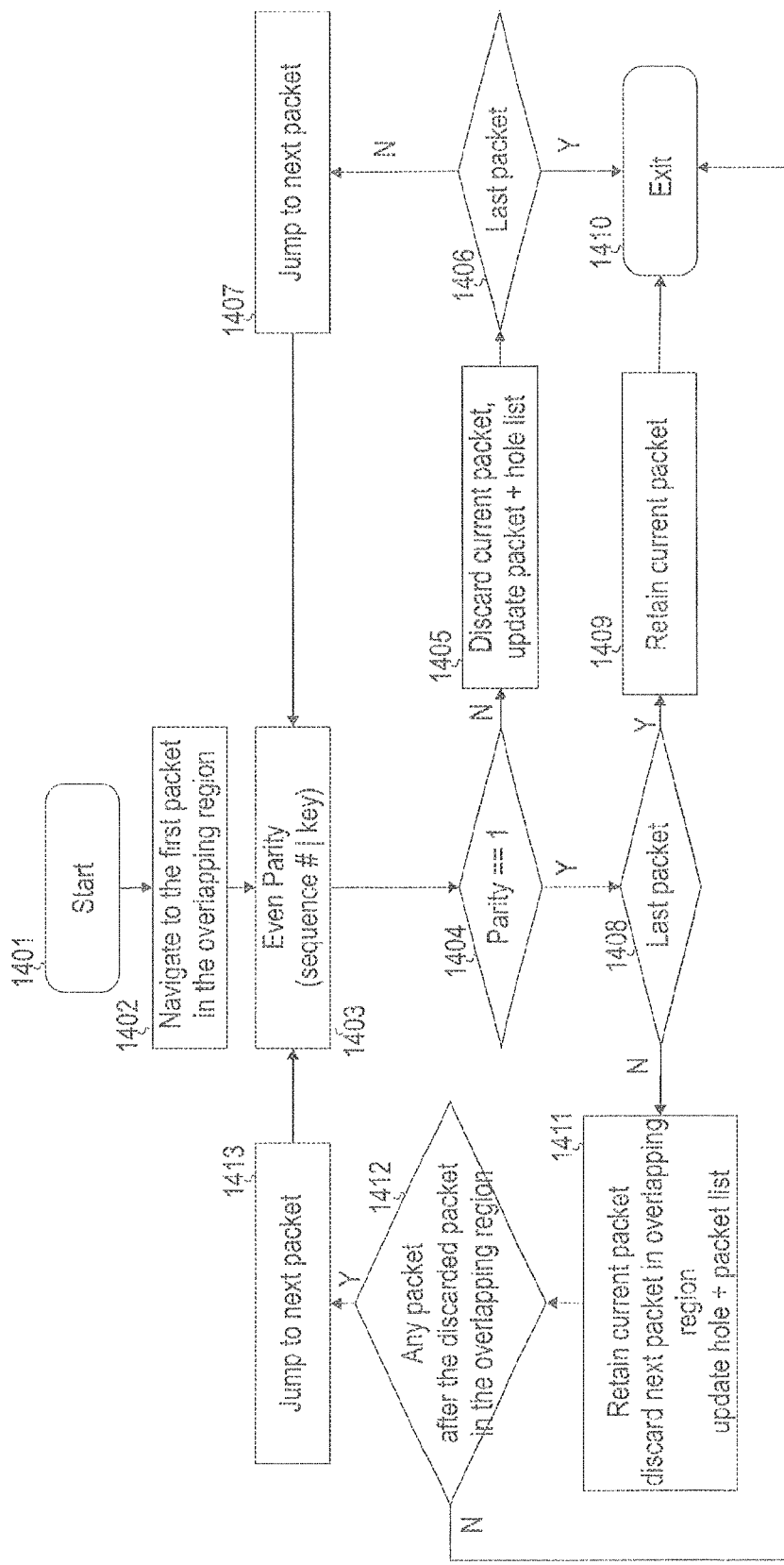
FIG. 14 is a flowchart illustrating techniques of selectively discarding a given packet of the packetized data flow depending on a pseudorandom test of the given packet is at least partially overlapping with at least one further packet of the packetized data flow.

In FIG. 14, a flowchart is shown which illustrates aspects of the pseudorandom test. First, at 1401, overlapping packets 145 of the overlap region 1200 are received from step 1310 in FIG. 13. These packets 145 are identified again, 1402.

Next, at 1403, the even parity is determined based on the sequence identification 212 and the secure key of the repeater 110 for a current packet from the overlap region 1200.

At 1404 it is checked whether the parity of the current packet equals One. If this is not the case, current packet 145 is discarded, 1405.

Then, it is checked whether a further packet exists in the overlap region 1200, 1406; if a further packet exists, this packet is taken is the current packet, 1407, and again the parity is determined, 1403. Otherwise, the method ends, 1410.

If, at 1404, the parity does not equal One, at 1408 it is checked whether the current packet is the last packet in the overlap region 1200. If this is the case, the current packet is retained, i.e., not discarded, 1409, and the method ends, 1410.

However, if there is a further packet at 1408, the current packet is retained, i.e., not discarded and the next packet in the overlap region 1200 is automatically dropped, 1411 (case 'X' in Table 3).

Next, it is checked whether there is still another packet after the discarded packet in the overlap region 1200, 1412. If this is the case, then the next packet which has not been discarded yet is taken as the current packet, 1413, and the method commences with determining the parity of that packet 145, 1403. Otherwise, the method ends 1410.

Figure 15:
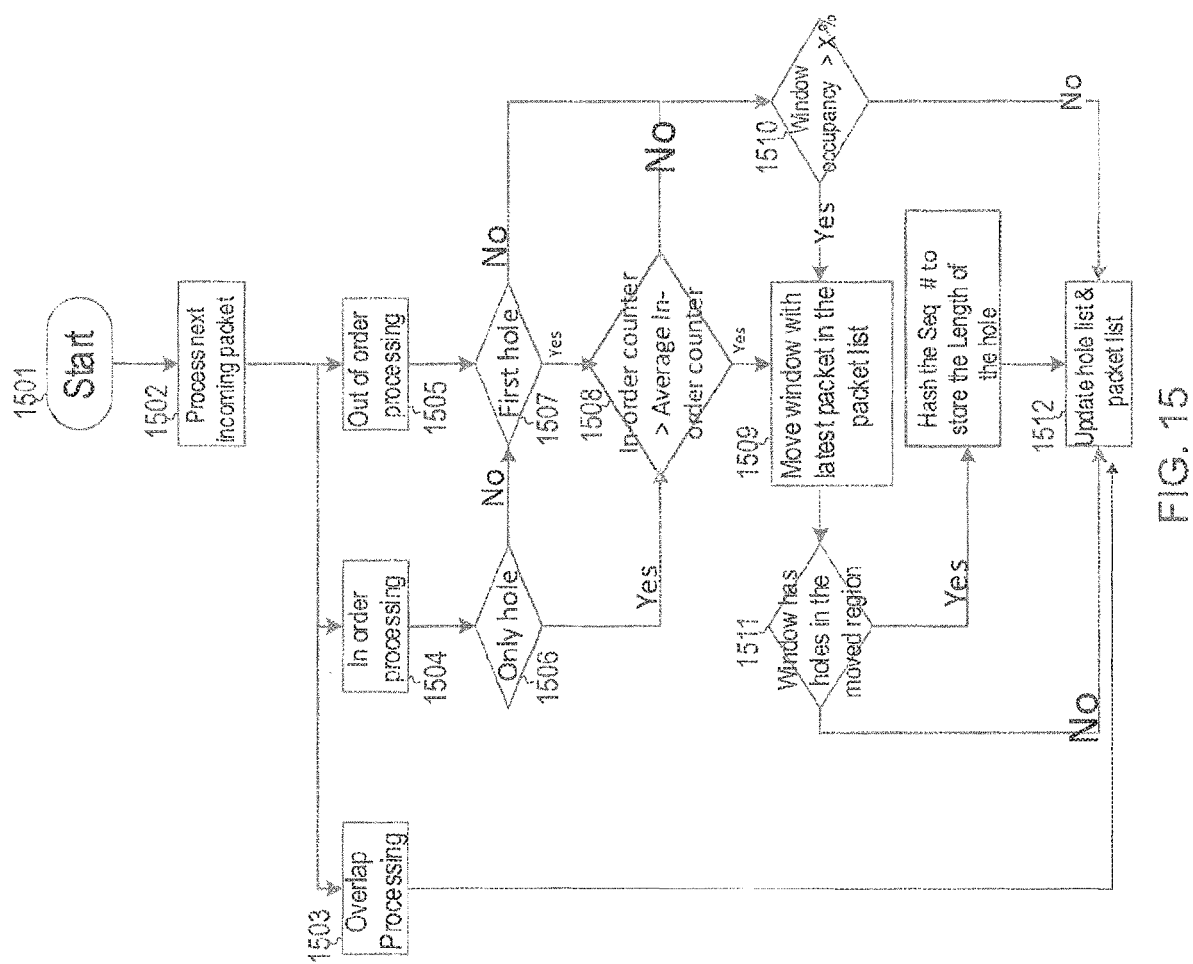
FIG. 15 is a flowchart illustrating techniques of moving a moving window implementing a split list depending on a threshold comparison between a filling factor of the moving window and a predefined threshold.

Moving the Moving Window:

There may be situations where the moving window 140 is filled. In such a scenario, the old entries in the moving window 141 have to be flushed to make space for new entries. Flushing old entries can correspond to moving the moving window 140, i.e., shifting the lower boundary of the moving window 140. Said moving of the moving window 140 may depend on a threshold comparison between a filling factor of the moving window and a predefined threshold. FIG. 15 is a flowchart illustrating aspects of moving the moving window 140.

A programmable window occupancy factor or filling factor is employed. The filling factor may, e.g., correspond to the percentage of the moving window 140 filled; it may be compared with a predefined threshold which determines when the window can be moved In a further approach, a local average of the previous "y" in-order counters 901 can also be used to move the window. Firstly, the comparison is done with the current in-order counter 901 and the moving average of previous "y" in-order counters 901. In particular in a scenario where there is a sequence of in order packets followed by a single hole in the window: If the current in-order counter has a larger value than the average value, the incoming packet will be discarded even in case of overlaps; thereby, the moving window 140 can be moved by flushing old entries. If the comparison fails, then the filling factor is taken into account when moving the moving window 140.

Now referring to FIG. 15, at 1501 and incoming packet 145 is received and processed at 1502, e.g., according to the techniques as illustrated in FIG. 8. As an outcome of the processing at 1502, the incoming packet 145 is classified as overlapping, 1503; in-order, 1504; or out-of-order, 1505.

In case the incoming packet 145 is at least partially overlapping, 1503, the window is not moved as packets could be dropped in the overlapping region and the moving window 140 is updated to take into account the overlapping incoming packet 145.

In case the incoming packet is in-order, 1504, it is checked whether the packet 145 fills completely or partially with only a single hole in the hole list 412 of the moving window 410, 1506. If this is the case, at 1508, it is checked whether the value of the current in-order counter 901 is larger than an average of the values of previous in-order counters. If the current in-order counter 901 has a larger value if compared to the average of values of the previous in-order counters, the window is moved, 1509, and, at 1511, it is checked whether there are any holes in the region that is below the lower boundary of the moving window 140. If this is not the case, the moving window is updated to take into account the new lower boundary, 1512.

However, if—at 1511—it is determined that there are holes in the region that is below the lower boundary of the moving window 140, a hash of the sequence identifications 212 of the holes is determined to store the length of the holes that are flushed from the moving window 140. Only then the moving window 140 is updated, 1512. The sequence identification 212 is used as the unique hash index to store the length of the packet which is stored in the memory when a hole is moved during the process of advancing the moving window. This information then used in scenarios where an incoming packet which may fill hole which doesn't exist in the window as it was moved during the advancement of the moving window. For example, when a packet is lost in one of the network nodes, a large latency in the stream communication can result which can also create a hole. Then, if the window is moved, the process of storing the sequence identification and the packet length will be useful to accept the incoming packet for processing at a later time and not discard the packet. The uniqueness of the packet can be identified using the sequence identification and the packet length which are stored.

Now referring to the scenario that for the in-order incoming packet 145 it is determined that there is more than one hole in the moving window 140, 1506: it is then determined whether the incoming packet 145 fills the first hole of the multiple holes, 1507. If this is not the case, the filling factor is determined, 1510, and a threshold comparison between the filling factor of the moving window 140 and a predefined threshold (labeled X in FIG. 15) is executed. If the filling factor does not exceed the threshold, the moving window 140 is not moved and updated accordingly 1512 to take into account the new incoming packet 145.

However, if at 1510 it is determined that the filling factor exceeds the predefined threshold, the moving window 140 is moved to flush entries from below the new lower boundary, 1509. From there on, the process proceeds as previously explained with respect to the in-order processing, 1504.

If the incoming packet is an out-of-order packet, 1505, it is first checked whether the incoming packet 145 fills the first hole of the moving window 140, 1507. From there on, the process continues as previously explained with respect to the in-order processing, 1504.

Summarizing, above techniques of intrusion prevention have been illustrated which may find particular application for intrusion prevention regarding overlap attacks. E.g., overlap attacks may be used by attackers to introduce ambiguities in the NIPS to create evasion attacks. If compared to reference implementations, the techniques described herein require fewer processor resources and memory resources. Further, the techniques described herein allow to increase the system security by reducing the predictability in dealing with the overlap attacks; this makes it difficult for an attacker to craft attacks through which the security systems can be evaded.

Some scenarios of the techniques described herein are based on moving window packet reassembly techniques which allow to reassemble packets and identify overlap attacks in an efficient way. Some scenarios of the techniques rely the flow history of the packetized data flow to discard overlapping packets, e.g., based on average in-order packet count and/or a packet length. E.g., in a scenario where the calculated guess cannot be made through the flow history of the packetized flow, overlapping packets in the overlap region may be dropped in a pseudorandom fashion so that attackers cannot predict how the system works to evade the same.

The invention claimed is:

1. A network device, comprising:
an interface configured to communicate with at least one further network node employing a packetized data flow of packets,
at least one processor circuit configured to receive, via the interface, a given packet of the packetized data flow,
wherein the at least one processor circuit is configured to selectively discard the given packet depending on a flow history of the packetized data flow and if a decision to selectively discard the given packet cannot be made based on the flow history, selectively discard the (liven packet based on a pseudorandom test.

2. The network device of claim 1,
wherein the at least one processor circuit is further configured to selectively execute said selectively discarding if the given packet is at least partially overlapping with at least one further packet of the packetized data flow.

3. The network device of claim 2,
wherein the at least one processor circuit is configured to selectively discard the given packet depending on the flow history if a boundary of the given packet matches a boundary of the at least one further packet.

4. The network device of claim 2,
wherein the at least one processor circuit is further configured to determine whether the given packet is at least partially overlapping with the at least one further packet by employing a moving window which identifies packets of the packetized data flow.

5. The network device of claim 4,
wherein each packet of the packetized data flow has a sequence identification, wherein the network node further comprises:
a memory configured to implement a receive buffer for packets of the packetized data flow, wherein the moving window identifies the respective sequence identifications and lengths of packets of the packetized data flow having been received in the receive buffer.

6. The network device of claim 5,
wherein the moving window identifies holes in a sequence identification space of the packets of the packetized data having been received in the receive buffer.

7. The network device of claim 6,
wherein the memory is configured to implement the moving window as a split list, the split list distinguishing between the packets of the packetized data flow having been received in the receive buffer and the holes in the sequence identification space of the packets of the packetized data having been received in the receive buffer.

8. The network device of claim 5,
wherein the at least one processor circuit is configured to control the memory to move the moving window depending on a threshold comparison between a filling factor of the moving window and a predefined threshold.

9. A network device, comprising:
an interface configured to communicate with at least one further network node employing a packetized data flow of packets,
at least one processor circuit configured to receive, via the interface, a given packet of the packetized data flow,
wherein the at least one processor circuit is configured to selectively discard the given packet depending on a flow history of the packetized data flow and a pseudorandom test,
wherein each packet of the packetized data flow has a sequence identification, and wherein the pseudorandom test comprises at least one of a parity associated with the given packet, a secure key of the network device, the sequence identification of given packet, a state of the at least one processor circuit; and a clock counter of the at least one processor circuit.

10. The network device of claim 1,
wherein each packet of the packetized data flow has a sequence identification, wherein the network device further comprises:
a memory configured to implement a receive buffer for packets of the packetized data flow,
wherein the flow history comprises an average number of packets of the packetized data flow having been sequentially received in the receive buffer in order of the corresponding sequence identifications.

11. The network device of claim 10,
wherein the at least one processor circuit is configured to discard the given packet depending on the flow history if the average number of packets of the packetized data flow having been sequentially received in the receive buffer in order of the corresponding sequence identifications is larger than a number of packets adjacent to the given packet in the packetized data flow and having been sequentially received in the receive buffer in order of the corresponding sequence identifications.

12. The network device of claim 1, further comprising:
a memory configured to implement a receive buffer for packets of the packetized data flow,
wherein the flow history comprises a length of packets of the packetized data flow having been received in the receive buffer.

13. The network device of claim 12,
wherein the at least one processor circuit is configured to discard the given packet depending on the flow history if the length of the given packet differs from the length of at least one packet adjacent to the given packet in the packetized data flow.

14. The network device of claim 1,
wherein packets of the packetized data flow are Transmission Control Protocol, TCP, segments or Internet Protocol, IP, datagrams.

15. The network device of claim 1,
wherein the network device is a router configured to forward the packetized data flow between at least two further network devices.

16. A method, comprising:
receiving a given packet of a packetized data flow of packets,
selectively discarding the given packet depending on a flow history of the packetized data flow and if a decision to selectively discard the given packet cannot be made based on the flow history, selectively discard the given packet based on a pseudorandom test.

17. The method of claim 16,
wherein said selectively discarding is selectively executed if the given packet is at least partially overlapping with at least one further packet of the packetized data flow.

18. The method of claim 17,
wherein said selectively discarding depends on the flow history if a boundary of the given packet matches a boundary of the at least one further packet.

19. The method of claim 17, further comprising:
determining whether the given packet is at least partially overlapping with the at least one further packet by employing a moving window which identifies packets of the packetized data flow.

20. The method of claim 16, wherein the method is executed by a network device, comprising:
an interface configured to communicate with at least one further network node employing a packetized data flow of packets,
at least one processor circuit configured to receive, via the interface, a given packet of the packetized data flow,
wherein the at least one processor circuit is configured to selectively discard the given packet depending on at least one of a flow history of the packetized data flow and a pseudorandom test.

* * * * *